United States Patent
Ye et al.

(10) Patent No.: US 10,970,526 B1
(45) Date of Patent: Apr. 6, 2021

(54) FACIAL IMAGE RECONSTRUCTION METHOD AND SYSTEM

(71) Applicant: INDUSTRIAL TECHNOLOGY RESEARCH INSTITUTE, Hsinchu (TW)

(72) Inventors: Shu-Hao Ye, Chiayi (TW); Chi-Tien Sun, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/715,548

(22) Filed: Dec. 16, 2019

(30) Foreign Application Priority Data

Nov. 1, 2019 (TW) ................. 108139712

(51) Int. Cl.
G06K 9/00 (2006.01)
G06K 9/62 (2006.01)

(52) U.S. Cl.
CPC ..... *G06K 9/00295* (2013.01); *G06K 9/00255* (2013.01); *G06K 9/00275* (2013.01); *G06K 9/6231* (2013.01); *G06K 9/6281* (2013.01)

(58) Field of Classification Search
CPC ........... G06K 9/00308; G06K 9/00315; G06K 2009/00322; G06K 2009/00328; G06K 9/00221; G06K 9/00228; G06K 9/00234; G06K 9/00241; G06K 9/00248; G06K 9/00255; G06K 9/00261; G06K 9/00268; G06K 9/00275; G06K 9/00281; G06K 9/00288; G06K 9/00295; G06K 9/00302;
(Continued)

(56) References Cited

U.S. PATENT DOCUMENTS 9,813,643 B2 * 11/2017 Terre ................... H04N 5/2257
9,830,506 B2    11/2017 Short et al.
(Continued)

FOREIGN PATENT DOCUMENTS

CN 108108704 A 6/2018
CN 108960159 A 12/2018
(Continued)

OTHER PUBLICATIONS

Zhang, He, et al. "Generative adversarial network-based synthesis of visible faces from polarimetric thermal faces." 2017 IEEE International Joint Conference on Biometrics (IJCB). IEEE, 2017. (Year: 2017).*
(Continued)

*Primary Examiner* — Avinash Yentrapati
(74) *Attorney, Agent, or Firm* — Birch, Stewart, Kolasch & Birch, LLP

(57) ABSTRACT

In a training phase of a facial image reconstruction system, a thermal facial image is input into a convolutional encoder and a pre-trained thermal facial recognition model for feature fusion. The fusion result is input into a convolutional decoder for visible facial image reconstruction. A hybrid loss function is used in the training phase. In the training phase, the reconstructed visible facial image and its corresponding real visible facial image are input into the pre-trained visible facial recognition model and the pre-trained facial landmark detection model to calculate the hybrid loss function for model learning and parameter update.

16 Claims, 5 Drawing Sheets

Facial image reconstruction system 10

(58) Field of Classification Search
CPC ...... G06T 2207/30201; H04N 1/00336; H04N 5/23219; A61B 5/1176; G06F 16/784
See application file for complete search history.

(56) References Cited

U.S. PATENT DOCUMENTS

| | | | |
|---|---|---|---|
| 2017/0046833 A1 | 2/2017 | Lurie et al. | |
| 2017/0132458 A1* | 5/2017 | Short | G06K 9/00255 |
| 2018/0330160 A1* | 11/2018 | Yamamoto | G06K 9/6202 |

FOREIGN PATENT DOCUMENTS

| | | |
|---|---|---|
| TW | 201120802 A1 | 6/2011 |
| TW | 201832134 A | 9/2018 |
| TW | 201832181 A | 9/2018 |
| TW | 201903659 A | 1/2019 |

OTHER PUBLICATIONS

Kniaz, V. V., V. S. Gorbatsevich, and V. A. Mizginov. "Thermalnet: a deep convolutional network for synthetic thermal image generation." The International Archives of Photogrammetry, Remote Sensing and Spatial Information Sciences 42 (2017): 41. (Year: 2017).*

Kresnaraman, Brahmastro, et al. "Reconstructing face image from the thermal infrared spectrum to the visible spectrum." Sensors 16.4 (2016): 568. (Year: 2016).*

Litvin, Andre, et al. "A novel deep network architecture for reconstructing RGB facial images from thermal for face recognition." Multimedia Tools and Applications 78.18 (2019): 25259-25271. (Year: 2019).*

Riggan, Benjamin S., et al. "Estimation of visible spectrum faces from polarimetric thermal faces." 2016 IEEE 8th international conference on biometrics theory, applications and systems (BTAS). IEEE, 2016. (Year: 2016).*

Wang, Zhongling, Zhenzhong Chen, and Feng Wu. "Thermal to visible facial image translation using generative adversarial networks." IEEE Signal Processing Letters 25.8 (2018): 1161-1165. (Year: 2018).*

Di, Xing, He Zhang, and Vishal M. Patel. "Polarimetric thermal to visible face verification via attribute preserved synthesis." 2018 IEEE 9th International Conference on Biometrics Theory, Applications and Systems (BTAS). IEEE, 2018. (Year: 2018).*

Berg et al., "Generating Visible Spectrum Images from Thermal Infrared.", Computer Vision Foundation. pp. 1256-1265.

Hermosilla et al., "A comparative study of thermal face recognition methods in unconstrained environments.", Pattern Recognition. 45, pp. 2445-2459, 2012.

Kresnaraman et al., "Reconstructing Face Image from the Thermal Infrared Spectrum to the Visible Spectrum.", Sensors. 16, 568, 16 pages, 2016.

Riggan et al., "Thermal to Visible Synthesis of Face Images using Multiple Regions.", IEEE Winter Conference on Applications of Computer Vision. pp. 30-38, 2018.

Wu et al., "Thermal Face Recognition Using Convolutional Neural Network.", International Conference on Optoelectronics and Image Processing. pp. 6-9, 2016.

* cited by examiner

FACIAL IMAGE RECONSTRUCTION METHOD AND SYSTEM

This application claims the benefit of Taiwan application Serial No. 108139712, filed Nov. 1, 2019, the disclosure of which is incorporated by reference herein in its entirety.

TECHNICAL FIELD

The disclosure relates in general to a facial image reconstruction method and system.

BACKGROUND

Along with the development in the technology of big data and deep learning, facial recognition technology is already a mature technology. However, the recognition rate may decrease in some extreme and complicated situations such as dusky illumination, heavy makeup on user's face or disguise. Therefore, over the years, many researches are dedicated to performing facial recognition using infrared light thermal image.

According to the infrared light thermal image technology, an infrared light is emitted to detect the thermal radiation from the human body to form an image according to the temperature difference between different parts of the body. With an infrared light of some wavebands (for example, 8 μm~14 μm), normally an image can be photographed without using any additional light source. The infrared light thermal image technology can be used in applications such as thermal imaging/temperature control, maintenance predictability and gas leakage detection.

In recent years, infrared light facial recognition has had many opportunities and applications in people's real life and has achieved very good recognition results in areas such as biometric passport clearance system and building self-service clearance system. Such type of infrared light facial recognition is independent of the ambient light and can provide high quality facial image.

Normally, for the infrared light thermal facial recognition technology to effectively recognize identity, relevant facial infrared light features must be established in advance. However, it is not easy to investigate and track the identity of unknown faces. Therefore, it could be a possible resolution to reconstruct the infrared light facial image as a visible light image.

Current technology works very well with the reconstruction of known facial image but works not so good with the reconstruction of unknown facial image. Furthermore, some technologies fail to emphasize facial discriminability.

SUMMARY

According to one embodiment, a facial image reconstruction method is provided. The method includes: pre-processing a thermal facial image read from a storage device to obtain a pre-processed thermal facial image and define a face region in the pre-processed thermal facial image; inputting the pre-processed thermal facial image into a convolutional encoder and down-sampling the pre-processed thermal facial image to extract a first 3D characteristic vector; inputting the pre-processed thermal facial image into a pre-trained thermal facial recognition model to extract a 1D characteristic vector; feature-fusing the 3D characteristic vector extracted by the convolutional encoder and the 1D characteristic vector extracted by the pre-trained thermal facial recognition model to obtain a second 3D characteristic vector; up-sampling the second 3D characteristic vector to obtain a reconstructed visible facial image having the same size with the thermal facial image by a convolutional decoder, wherein the reconstructed visible facial image is stored in the storage device; inputting a real visible facial image and the reconstructed visible facial image into a pre-trained visible facial recognition model to obtain a first characteristic vector, a second characteristic vector, a third characteristic vector and a fourth characteristic vector, wherein, the first characteristic vector and the second characteristic vector are for obtaining an identity loss, and the third characteristic vector and the fourth characteristic vector are for obtaining a content loss; inputting the real visible facial image and the reconstructed visible facial image into a pre-trained facial landmark detection model to obtain a first facial landmark model and a second facial landmark model, wherein the first facial landmark model and the second facial landmark model are for obtaining a facial landmark loss; and obtaining a hybrid loss function for adjusting the convolutional encoder and the convolutional decoder according to the identity loss, the content loss and the facial landmark loss.

According to another embodiment, a facial image reconstruction system is provided. The system includes a feature fusion convolutional autoencoder, a pre-trained visible facial recognition model and a pre-trained facial landmark detection model. The feature fusion convolutional autoencoder includes a pre-processing module for pre-processing a thermal facial image read from a storage device to obtain a pre-processed thermal facial image and define a face region in the pre-processed thermal facial image; a convolutional encoder for down-sampling the pre-processed thermal facial image to extract a first 3D characteristic vector; a pre-trained thermal facial recognition model for extracting a 1D characteristic vector from the pre-processed thermal facial image; a feature fusion module for feature-fusing the 3D characteristic vector extracted by the convolutional encoder and the 1D characteristic vector extracted by the pre-trained thermal facial recognition model to obtain a second 3D characteristic vector; and a convolutional decoder for up-sampling the second 3D characteristic vector to obtain a reconstructed visible facial image having the same size with the thermal facial image, the reconstructed visible facial image is stored in the storage device. A real visible facial image and the reconstructed visible facial image are input into the pre-trained visible facial recognition model to obtain a first characteristic vector, a second characteristic vector, a third characteristic vector and a fourth characteristic vector. The first characteristic vector and the second characteristic vector are for obtaining an identity loss. The third characteristic vector and the fourth characteristic vector are for obtaining a content loss. The real visible facial image and the reconstructed visible facial image are input into the pre-trained facial landmark detection model to obtain a first facial landmark model and a second facial landmark model, wherein the first facial landmark model and the second facial landmark model are for obtaining a facial landmark loss. A hybrid loss function for adjusting the convolutional encoder and the convolutional decoder is obtained according to the identity loss, the content loss and the facial landmark loss.

The above and other aspects of the disclosure will become better understood with regard to the following detailed description of the preferred but non-limiting embodiment(s). The following description is made with reference to the accompanying drawings.

Figure 1:
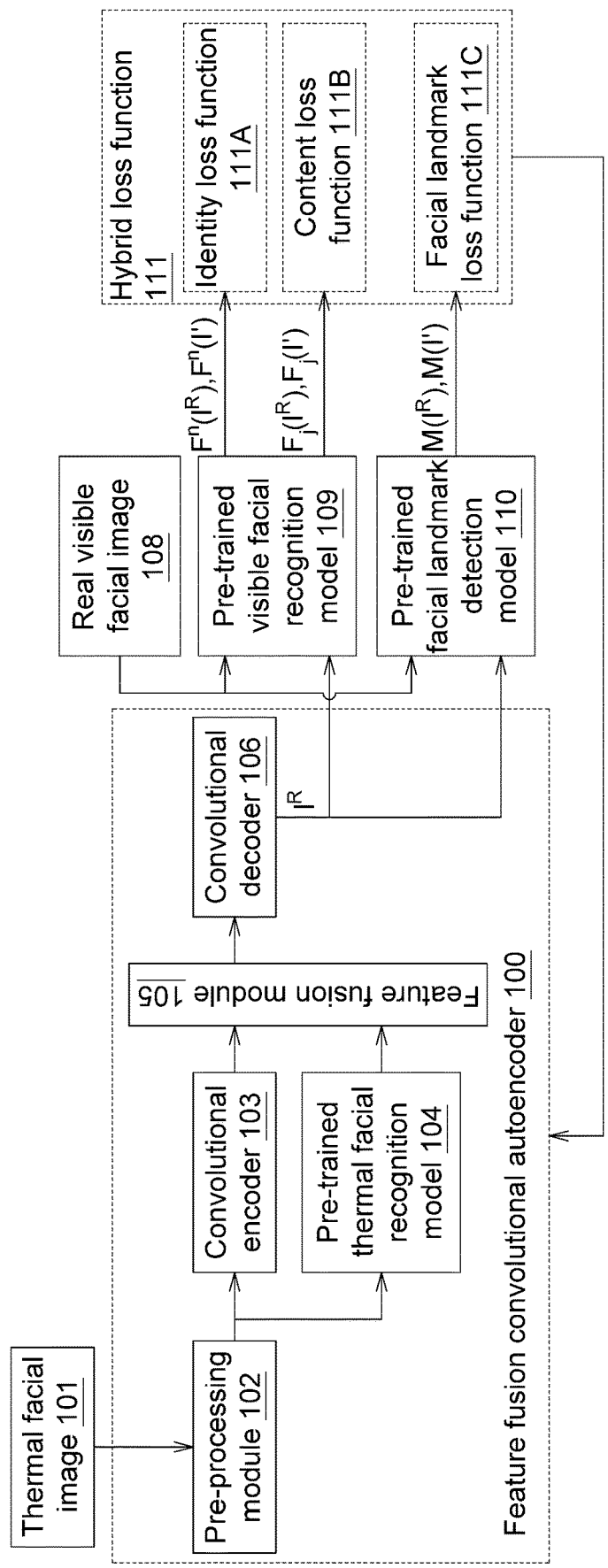
FIG. 1 is a schematic diagram of a facial image reconstruction system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to generally known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all technical features of any embodiment of the present disclosure.

Refer to FIG. 1. The facial image reconstruction system according to an exemplary embodiment of the disclosure reconstructs a "thermal facial image" as a "visible facial image". In a training phase of the facial image reconstruction system, the feature fusion convolutional autoencoder inputs a batch of "thermal facial images" into the convolutional encoder and the pre-trained thermal facial recognition model for feature fusion. The fusion result is input into the convolutional decoder for visible facial image reconstruction. As for the loss function used in the training phase (also referred as model learning), a hybrid loss function, formed of an identity loss function, a content loss function and a facial landmark loss function, is used. In a training phase, the reconstructed visible facial image and its corresponding real visible facial image are input into the pre-trained visible facial recognition model and the pre-trained facial landmark detection model to calculate the three abovementioned loss functions. Then, the three abovementioned loss functions are combined according to different weights for model learning and parameter update.

FIG. 1 is a schematic diagram of a facial image reconstruction system according to an exemplary embodiment of the disclosure. The facial image reconstruction system 10 includes a feature fusion convolutional autoencoder 100, a pre-trained visible facial recognition model 109, a pre-trained facial landmark detection model 110 and a hybrid loss function 111. The feature fusion convolutional autoencoder 100 includes a pre-processing module 102, a convolutional encoder 103, a pre-trained thermal facial recognition model 104, a feature fusion module 105 and a convolutional decoder 106. The hybrid loss function 111 is formed of an identity loss function 111A, a content loss function 111B and a facial landmark loss function 111C.

During training, a plurality of thermal facial images 101 and their corresponding real visible facial images 108 are used as a data set. That is, for the users, their individual thermal facial images 101 are obtained by way of thermal imaging, and their individual real visible facial images 108 are obtained by way of visible imaging. For the same user, a one-to-one relationship is formed between his/her thermal facial image 101 and his/her real visible facial image 108. The thermal facial images 101 and the real visible facial images 108 can be stored in a storage device.

The thermal facial images 101 are input into the pre-processing module 102 for pre-processing to obtain a pre-processed thermal facial image and define a face squared region in the pre-processed thermal facial image, and further reduce the face squared region to a predetermined size. For example, the thermal facial images 101 are read from the storage device and then are input into the pre-processing module 102.

The pre-processed thermal facial image of the pre-processing module 102 is input into the convolutional encoder 103, which down-samples the pre-processed thermal facial image and extracts a 3D (three-dimension) characteristic vector.

The pre-trained thermal facial recognition model 104 used in an embodiment of the disclosure can be realized by an existing thermal facial recognition model 104. The pre-processed thermal facial image obtained by the pre-processing module 102 is input into the pre-trained thermal facial recognition model 104 to extract a 1D (one dimension) characteristic vector from a classification layer.

The feature fusion module 105 feature-fuses the 3D characteristic vector extracted by the convolutional encoder 103 and the 1D characteristic vector extracted by the pre-trained thermal facial recognition model 104.

Figure 2:
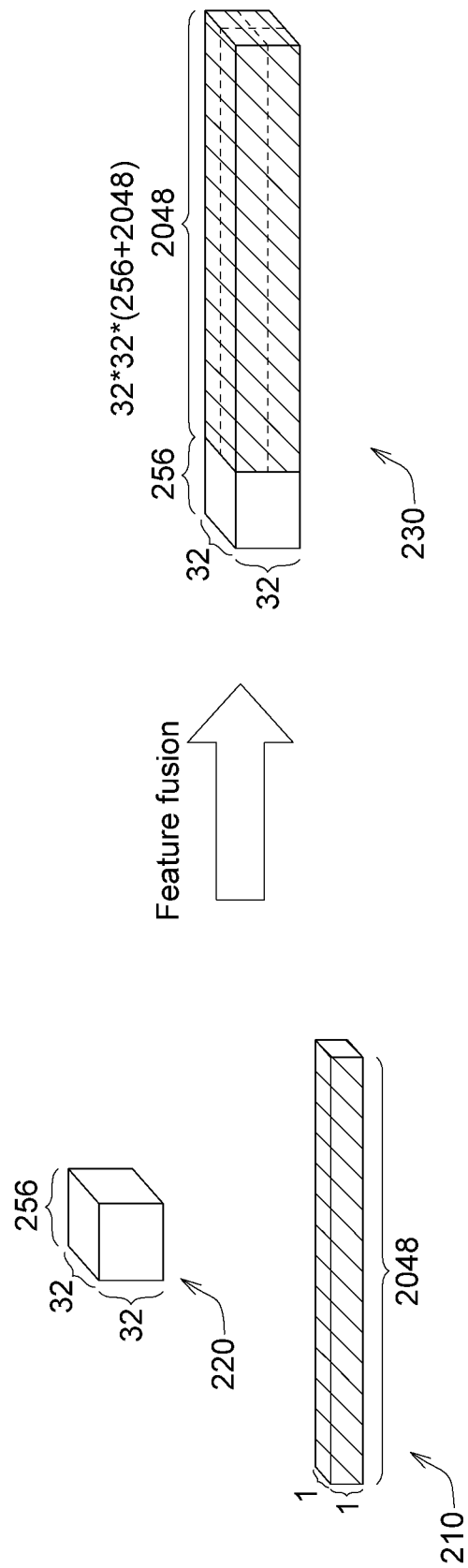
FIG. 2 is a schematic diagram of feature fusion according to an embodiment of the disclosure.

FIG. 2 is a schematic diagram of feature fusion according to an embodiment of the disclosure. FIG. 2 is for exemplary purpose only, not for limiting the disclosure. As indicated in FIG. 2, the 1D characteristic vector 210, such as a 1*1*2048 1D characteristic vector, is extracted by the pre-trained thermal facial recognition model 104, and the 3D characteristic vector 220, such as a 32*32*256 3D characteristic vector, is extracted by the convolutional encoder 103. During feature fusion, the 1D characteristic vector 210 is duplicated for several times (such as 32*32 times) to form a 3D characteristic vector (32*32*2048). Then, the duplicated 3D characteristic vector 32*32*2048 is combined with the 3D characteristic vector 220 (32*32*256) to obtain a 3D characteristic vector 230 (32*32*256+ 32*32*2048=32*32*2304).

The fused 3D characteristic vector obtained by the feature fusion module 105 is input into the convolutional decoder 106. The convolutional decoder 106 up-samples the 3D characteristic vector to obtain a reconstructed visible facial image $I^R$ having the same size with the thermal facial image 101. Similarly, the reconstructed visible facial image can be stored in the storage device.

In an embodiment of the disclosure, the pre-trained visible facial recognition model 109 can be realized by an existing visible facial recognition model. The real visible facial image 108 (designated by I') and the reconstructed visible facial image (designated by $I^R$) reconstructed by the convolutional decoder 106 are input into the pre-trained visible facial recognition model 109 to obtain two characteristic vectors $F''(I')$ and $F''(I^R)$. A cosine distance between the two characteristic vectors is calculated according to the identity loss function 111A to obtain an identity loss $L_{id}$ according to formula 1:

$$L_{id} = 1 - \left( \frac{F^n(I') \circ F^n(I^R)}{\|F^n(I')\|_2 \|F^n(I^R)\|_2} \right) \quad \text{(formula 1)}$$

In formula 1, n represents the quantity of the last layer.

Besides, the real visible facial image 108 (designated by I') and the reconstructed visible facial image (designated by $I^R$) reconstructed by the convolutional decoder 106 are input into the pre-trained visible facial recognition model 109 to extract a feature map of the middle layers to obtain two characteristic vectors $F_j$ (I') and $F_j$ ($I^R$). An Euclidean distance between the two characteristic vectors $F_j$(I') and $F_j$($I^R$) is calculated according to the content loss function 111B. The Euclidean distance is averaged by the quantity of middle layers and the average is used as a content loss $L_{con}$ according to formula 2:

$$L_{con} = \sum_{j=0}^{n} \frac{\|F_j(I') - F_j(I^R)\|_2}{H_{Fj} * W_{Fj} * C_{Fj}} \quad \text{(formula 2)}$$

In formula 2, j represents a layer quantity parameter; $H_{Fj}$, $W_{Fj}$ and $C_{Fj}$ respectively represent the height parameter, the width parameter and the depth parameter of the real visible facial image 108 (or the reconstructed visible facial image).

Figure 3:
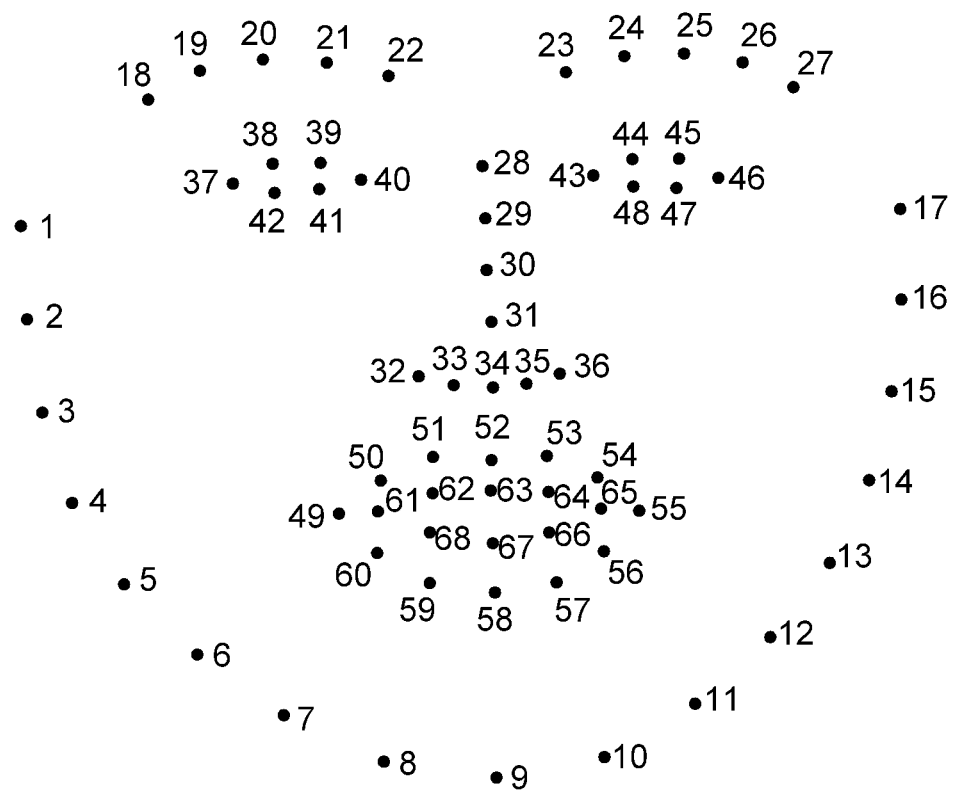
FIG. 3 is a schematic diagram of facial landmarks formed by 68 points extracted from the facial image by the pre-trained facial landmark detection model according to an embodiment of the disclosure.

In an embodiment of the disclosure, the pre-trained facial landmark detection model 110 (such as an existing facial landmark detection model) can perform the following operation: $M(I): \mathbb{R}^{H*W*C} \to \mathbb{R}^{68}$, wherein, H, W and C respectively represent the height parameter, the width parameter and the depth parameter of the facial image. That is, M (I) can convert H*W*C dimensions into 68 dimensions. Or, the pre-trained facial landmark detection model 110 can use 68 points extracted from the facial image as facial landmarks as indicated in FIG. 3.

In an embodiment of the disclosure, the real visible facial image 108 (designated by I') and the reconstructed visible facial image (designated by $I^R$) reconstructed by the convolutional decoder 106 are input into the pre-trained facial landmark detection model 110 (such as an existing facial landmark detection model) to obtain facial landmark models M (I') and M ($I^R$). Then, the facial landmark models M (I') and M ($I^R$) are input into the facial landmark loss function 111C to calculate the Euclidean distance between the 68 facial landmarks of the real visible facial image 108 (that is, M (I')) and the 68 facial landmarks of the reconstructed visible facial image (that is, M ($I^R$)) to obtain a facial landmark loss $L_{lan}$, according to formula 3:

$$L_{lan} = \|M(I') - M(I^R)\|_2 \quad \text{formula 3}$$

Then, formulas (1)~(3) are combined with different parameter weights $\lambda_{id}$, $\lambda_{con}$ and $\lambda_{lan}$ to form a hybrid loss function 111 according to formula (4), wherein, the parameter weights $\lambda_{id}$, $\lambda_{con}$ and $\lambda_{lan}$ are adjustable and have a sum of 1.

$$\varepsilon(p) = \lambda_{id} L_{id} + \lambda_{con} L_{con} + \lambda_{lan} L_{lan} \quad \text{formula (4)}$$

The parameter weights are adjusted through back propagation to minimize the function ε(p). That is, the hybrid loss function 111 can be feedback to the feature fusion convolutional autoencoder 100 to adjust the parameters of the convolutional encoder 103 and the parameters of the convolutional decoder 106, such that the reconstructed visible facial image reconstructed by the convolutional decoder 106 can get even closer to the real visible facial image 108 (that is, the function ε(p) is minimized).

Figure 4A:
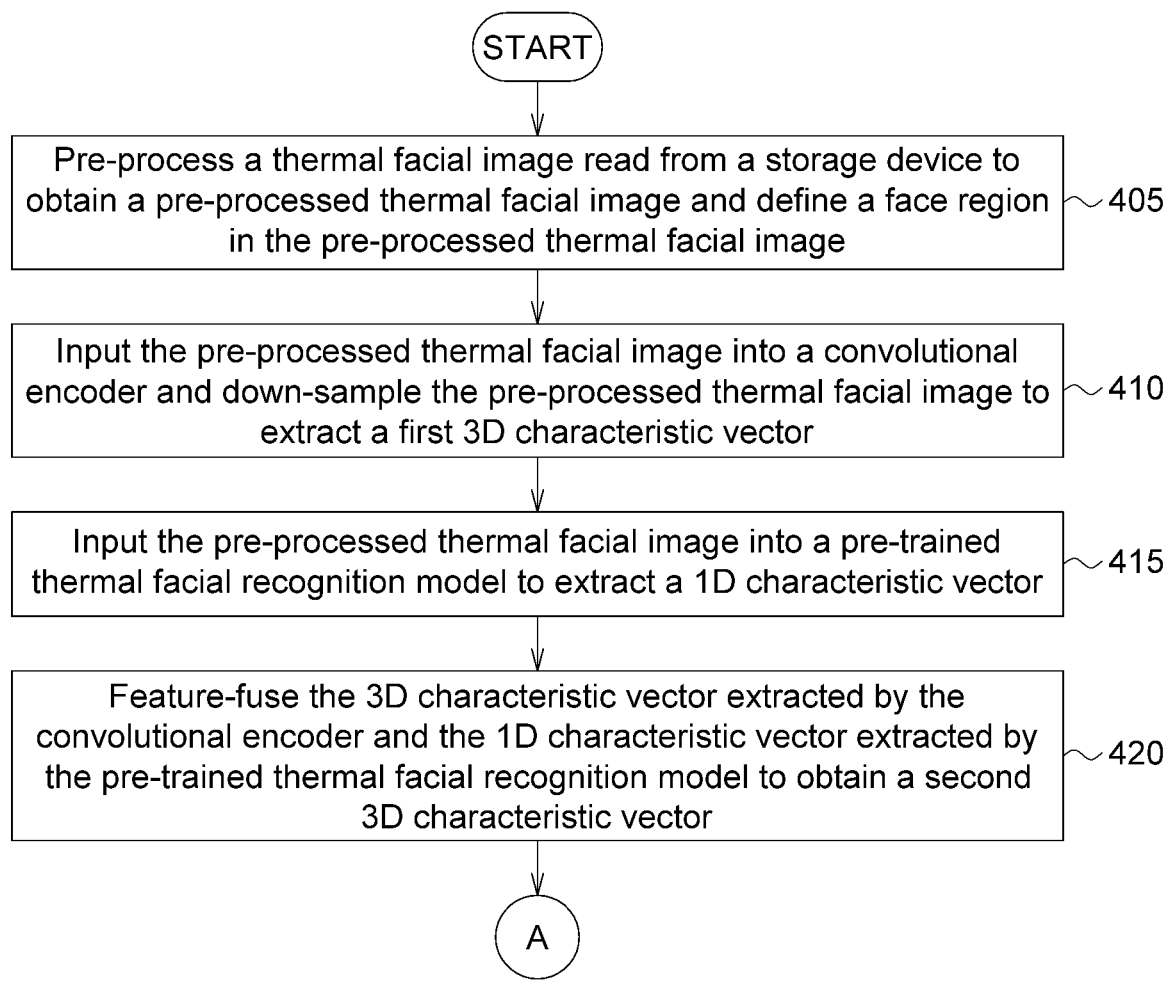
FIG. 4A and FIG. 4B are flowcharts of a facial image reconstruction method according to an exemplary embodiment of the disclosure.
Figure 4B:
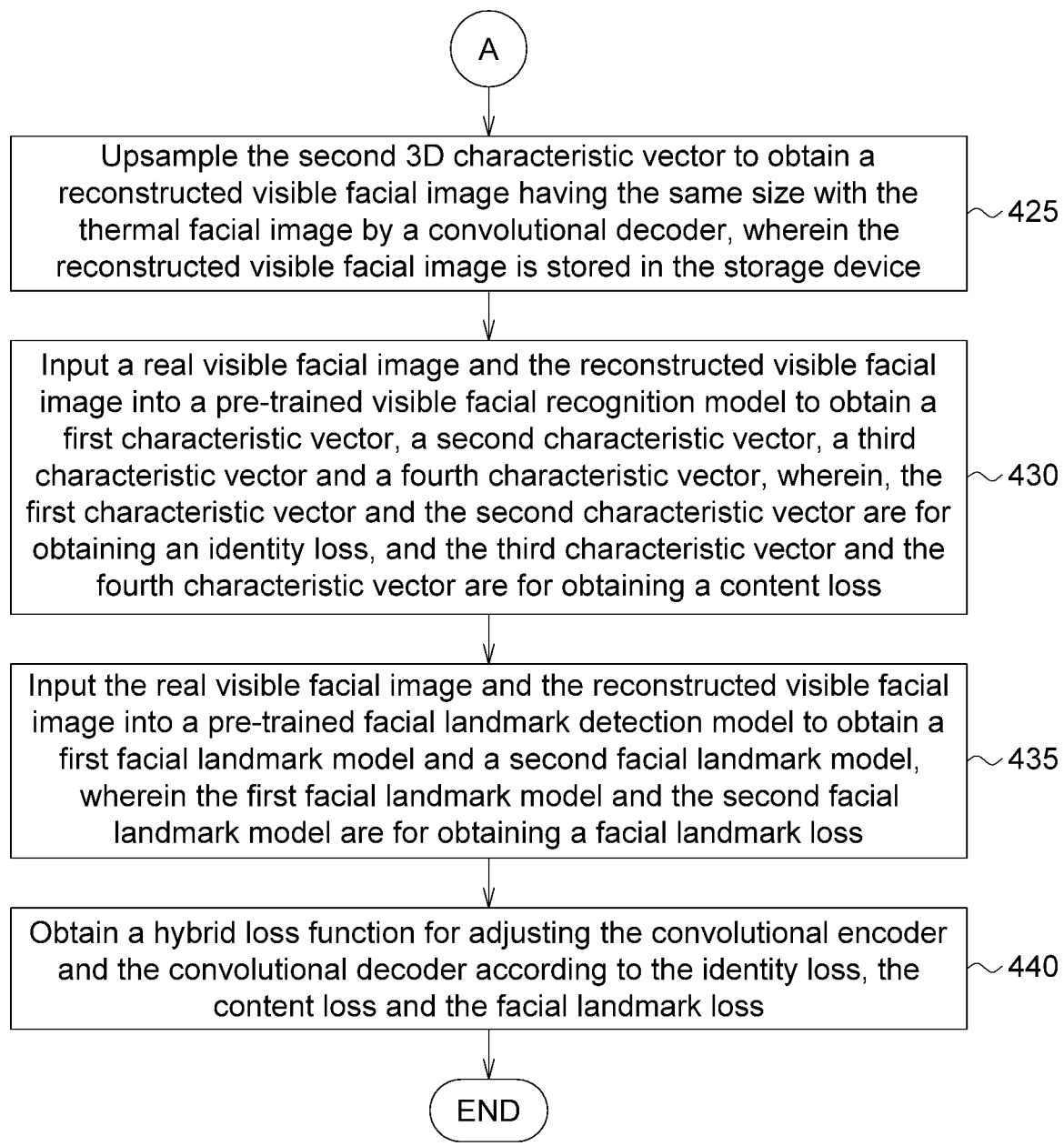

FIG. 4A and FIG. 4B are flowcharts of a facial image reconstruction method according to an exemplary embodiment of the disclosure. The method includes: pre-processing a thermal facial image read from a storage device to obtain a pre-processed thermal facial image and define a face region in the pre-processed thermal facial image (405); inputting the pre-processed thermal facial image into a convolutional encoder and down-sampling the pre-processed thermal facial image to extract a first 3D characteristic vector (410); inputting the pre-processed thermal facial image into a pre-trained thermal facial recognition model to extract a 1D characteristic vector (415); feature-fusing the 3D characteristic vector extracted by the convolutional encoder and the 1D characteristic vector extracted by the pre-trained thermal facial recognition model to obtain a second 3D characteristic vector (420); up-sampling the second 3D characteristic vector to obtain a reconstructed visible facial image having the same size with the thermal facial image by a convolutional decoder, wherein the reconstructed visible facial image is stored in the storage device (425); inputting a real visible facial image and the reconstructed visible facial image into a pre-trained visible facial recognition model to obtain a first characteristic vector, a second characteristic vector, a third characteristic vector and a fourth characteristic vector, wherein, the first characteristic vector and the second characteristic vector are for obtaining an identity loss, and the third characteristic vector and the fourth characteristic vector are for obtaining a content loss (430); inputting the real visible facial image and the reconstructed visible facial image into a pre-trained facial landmark detection model to obtain a first facial landmark model and a second facial landmark model, wherein the first facial landmark model and the second facial landmark model are for obtaining a facial landmark loss (435); and obtaining a hybrid loss function for adjusting the convolutional encoder and the convolutional decoder according to the identity loss, the content loss and the facial landmark loss (440).

In the above method, the reconstructed visible facial image and the real visible facial image 108 can be stored in the storage device, and then are read and input into the pre-trained visible facial recognition model 109 and the pre-trained facial landmark detection model 110.

In the above embodiments of the disclosure, (1) through the fusion of "the 1D characteristic vector extracted by the pre-trained thermal facial recognition model 104", the details of the reconstructed visible facial image become more real; (2) through the use of the hybrid loss function, the reconstructed visible facial image is more focused on the main features of the face, not only achieving the truthfulness of reconstruction but also improving the discriminability of personal identity; and (3) through the training of big data, unknown thermal facial image can be reconstructed.

In the above embodiments of the disclosure, a convolutional neural network (CNN) is used to train the feature fusion convolutional autoencoder 100 to extract main facial features. Furthermore, through the use of the hybrid loss function, better reconstructed visible facial image can be provided.

The technology of reconstructing the infrared light facial image as a visible light image has the advantages of: (1) more extensively tracking the identity; (2) providing more dedicated facial features; (3) painlessly introducing facial recognition technology; (4) more efficiently monitoring biological information.

The disclosure not only focuses on the reconstruction quality of facial features, but also emphasizes the discriminability of facial features and therefore accurately restores the visible facial image.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A facial image reconstruction method, comprising:
pre-processing a thermal facial image read from a storage device to obtain a pre-processed thermal facial image and define a face region in the pre-processed thermal facial image;
inputting the pre-processed thermal facial image into a convolutional encoder and down-sampling the pre-processed thermal facial image to extract a first 3D (three-dimension) characteristic vector;
inputting the pre-processed thermal facial image into a pre-trained thermal facial recognition model to extract a 1D (one-dimension) characteristic vector;
feature-fusing the 3D characteristic vector extracted by the convolutional encoder and the 1D characteristic vector extracted by the pre-trained thermal facial recognition model to obtain a second 3D characteristic vector;
up-sampling the second 3D characteristic vector to obtain a reconstructed visible facial image having the same size with the thermal facial image by a convolutional decoder, wherein the reconstructed visible facial image is stored in the storage device;
inputting a real visible facial image and the reconstructed visible facial image into a pre-trained visible facial recognition model to obtain a first characteristic vector, a second characteristic vector, a third characteristic vector and a fourth characteristic vector, wherein, the first characteristic vector and the second characteristic vector are for obtaining an identity loss, and the third characteristic vector and the fourth characteristic vector are for obtaining a content loss;
inputting the real visible facial image and the reconstructed visible facial image into a pre-trained facial landmark detection model to obtain a first facial landmark model and a second facial landmark model, wherein the first facial landmark model and the second facial landmark model are for obtaining a facial landmark loss; and
obtaining a hybrid loss function for adjusting the convolutional encoder and the convolutional decoder according to the identity loss, the content loss and the facial landmark loss.

2. The facial image reconstruction method according to claim 1, wherein, during pre-processing, the face region is reduced to a predetermined size.

3. The facial image reconstruction method according to claim 1, wherein, during feature fusion, the 1D characteristic vector is duplicated for several times to form a third 3D characteristic vector; and the third 3D characteristic vector is combined with the first 3D characteristic vector to obtain the second 3D characteristic vector.

4. The facial image reconstruction method according to claim 1, wherein, a cosine distance between the first characteristic vector and the second characteristic vector is calculated according to an identity loss function to obtain the identity loss.

5. The facial image reconstruction method according to claim 1, wherein, a first Euclidean distance between the third characteristic vector and the fourth characteristic vector is calculated according to a content loss function to obtain the content loss.

6. The facial image reconstruction method according to claim 1, wherein, the first facial landmark model and the second facial landmark model are input into a facial landmark loss function to calculate a second Euclidean distance between the first facial landmark model and the second facial landmark model to obtain the facial landmark loss.

7. The facial image reconstruction method according to claim 1, wherein, the identity loss, the content loss and the facial landmark loss are respectively combined with a first parameter weight, a second parameter weight and a third parameter weight to form the hybrid loss function, and the first parameter weight, the second parameter weight and the third parameter weight are adjustable and have a sum of 1.

8. The facial image reconstruction method according to claim 1, wherein, the first parameter weight, the second parameter weight and the third parameter weight are adjusted through back propagation.

9. A facial image reconstruction system, comprising:
a feature fusion convolutional autoencoder, comprising:
a pre-processing module for pre-processing a thermal facial image read from a storage device to obtain a pre-processed thermal facial image and define a face region in the pre-processed thermal facial image;
a convolutional encoder for down-sampling the pre-processed thermal facial image to extract a first 3D characteristic vector;
a pre-trained thermal facial recognition model for extracting a 1D characteristic vector from the pre-processed thermal facial image;
a feature fusion module for feature-fusing the 3D characteristic vector extracted by the convolutional encoder and the 1D characteristic vector extracted by the pre-trained thermal facial recognition model to obtain a second 3D characteristic vector;
a convolutional decoder for up-sampling the second 3D characteristic vector to obtain a reconstructed visible facial image having the same size with the thermal facial image, the reconstructed visible facial image is stored in the storage device; and
a pre-trained visible facial recognition model and a pre-trained facial landmark detection model, wherein,
a real visible facial image and the reconstructed visible facial image are input into the pre-trained visible facial recognition model to obtain a first characteristic vector, a second characteristic vector, a third characteristic vector and a fourth characteristic vector, wherein, the first characteristic vector and the second characteristic vector are for obtaining an identity loss, and the third characteristic vector and the fourth characteristic vector are for obtaining a content loss;
the real visible facial image and the reconstructed visible facial image are input into the pre-trained facial landmark detection model to obtain a first facial landmark model and a second facial landmark model, wherein the first facial landmark model and the second facial landmark model are for obtaining a facial landmark loss; and
a hybrid loss function for adjusting the convolutional encoder and the convolutional decoder is obtained according to the identity loss, the content loss and the facial landmark loss.

10. The facial image reconstruction system according to claim 9, wherein, the pre-processing module reduces the face region to a predetermined size.

11. The facial image reconstruction system according to claim 9, wherein, during feature fusion, the feature fusion module duplicates the 1D characteristic vector for several times to form a third 3D characteristic vector; and the third 3D characteristic vector is combined with the first 3D characteristic vector to obtain the second 3D characteristic vector.

12. The facial image reconstruction system according to claim 9, wherein, a cosine distance between the first characteristic vector and the second characteristic vector is calculated according to an identity loss function to obtain the identity loss.

13. The facial image reconstruction system according to claim 9, wherein, a first Euclidean distance between the third characteristic vector and the fourth characteristic vector is calculated according to a content loss function to obtain the content loss.

14. The facial image reconstruction system according to claim 9, wherein, the first facial landmark model and the second facial landmark model are input into a facial landmark loss function to calculate a second Euclidean distance between the first facial landmark model and the second facial landmark model to obtain the facial landmark loss.

15. The facial image reconstruction system according to claim 9, wherein, the identity loss, the content loss and the facial landmark loss are respectively combined with a first parameter weight, a second parameter weight and a third parameter weight to form the hybrid loss function, and the first parameter weight, the second parameter weight and the third parameter weight are adjustable and have a sum of 1.

16. The facial image reconstruction system according to claim 9, wherein, the first parameter weight, the second parameter weight and the third parameter weight are adjusted through back propagation.

* * * * *